G. McFEELY.
STEAM PUMP.
No. 94,426.                    Patented Aug. 31, 1869.
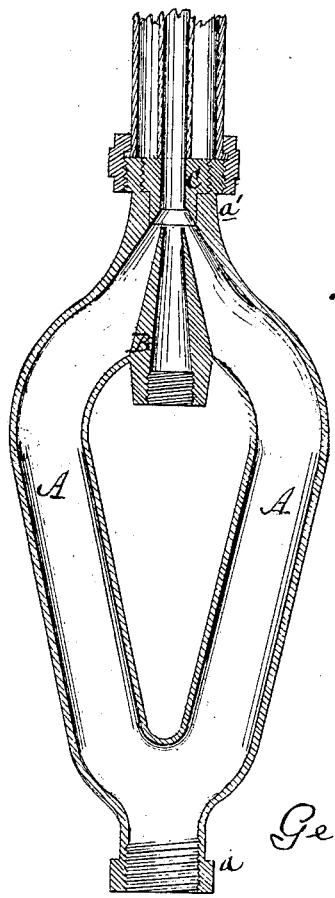
Witnesses.
E. R. Brown
Gacsmith
George McFeely
Inventor.
By J C Theaker
his attorney.

United States Patent Office.

GEORGE McFEELY, OF STEUBENVILLE, OHIO.

Letters Patent No. 94,426, dated August 31, 1869.

IMPROVEMENT IN STEAM-PUMPS.

The Schedule referred to in these Letters Patent and making part of the same.

*To all whom it may concern:*

Be it known that I, GEORGE McFEELY, of Steubenville, in the county of Jefferson, and State of Ohio, have invented a new and useful Improvement in Steam-Pumps; and I do hereby declare that the following is a full, clear, and exact description thereof, reference being had to the accompanying drawings, making part of this specification, and to the letters of reference marked thereon.

The nature of my invention consists in the connection of two or more curved pipes together at their upper and lower ends, whereby the lower ends may be attached to a suction-pipe and the upper ends to a discharge-pipe, and in the arrangement of the tapering-pipe at or near the upper point of junction, for the purpose of raising water by creating a vacuum in said curved pipes. Also, in the construction and arrangement of the bush, or thimble with a tapering bore to the discharge-end, for the purpose of giving greater force to the water passing through it.

To enable those skilled in the art to which my invention appertains to make and use the same, I will proceed to describe its construction and operation.

In the drawings—

A A represent two pipes joined together at their upper and lower ends, and curved outward in such a manner that the space between them is somewhat of the form of an inverted truncated cone.

The lower end $a$ is to be attached to a suction-pipe, leading from the vessel containing the water or other liquid to be raised, and the upper end $a'$ is to be attached to a discharge-pipe leading to the vessel into which the liquid is to be discharged.

At or near the upper point of junction of the curved pipes A A, and cast, or formed with them, and in a line with the discharge-pipe, is a short pipe, B, the bore of which is tapering and the outside conical; and the lower end is provided with a screw-thread or other suitable means for attaching a steam-pipe.

In the discharge-end $a'$, is inserted a bush, or thimble, C, the bore of which is straight, except at the lower end, where it is tapering, so as to form a continuation of the outer sides of the curved pipes A A.

In general, the diameter of the bore of said bush may be about half that of the pipes A A and about double that of the smaller end of the tapering pipe B; but as a larger or smaller bore may sometimes be required, according to the height to which it is desired to raise the water, I provide a number of bushes, with different-sized bores, any one of which may be inserted at pleasure. Instead of having a number of bushes, there may be a number of different-sized tubes, any one of which may be inserted in the bush, and the bush allowed to remain in the pipe.

A steam-pipe being attached to the pipe B, and steam introduced, a vacuum is created in the curved pipes A A and its connections, into which the water rushes, and is forced to the end of the discharge-pipe.

The tapering pipe B compresses the steam and increases its velocity, and the tapering form of the lower portion of the bush C operates in the same manner upon the water passing through it. This effect may be increased by attaching to the bush a pipe of the same bore, extending up several inches more or less inside of the discharge-pipe.

Having thus described my invention,

What I claim as new, and desire to secure by Letters Patent, is—

1. The tapering steam-pipe B, in combination with the curved pipes A A, joined at their upper and lower ends, for connecting with the suction-pipe and discharge-pipe, when arranged as shown and described.

2. The bush C, constructed and arranged substantially as shown and described.

GEORGE McFEELY.

Witnesses:
E. R. BROWN,
G. A. C. SMITH.